(12) United States Patent
Courtaux et al.

(10) Patent No.: US 10,520,287 B2
(45) Date of Patent: Dec. 31, 2019

(54) PYROTECHNICAL IGNITER

(71) Applicant: Autoliv Development AB, Vårgårda (SE)

(72) Inventors: Valerian Courtaux, Rueil-Malmaison (FR); Hervé Chevalier, L'Isle Adam (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/062,170

(22) PCT Filed: Dec. 8, 2016

(86) PCT No.: PCT/EP2016/080342
§ 371 (c)(1),
(2) Date: Jun. 14, 2018

(87) PCT Pub. No.: WO2017/102564
PCT Pub. Date: Jun. 22, 2017

(65) Prior Publication Data
US 2018/0292185 A1 Oct. 11, 2018

(30) Foreign Application Priority Data
Dec. 15, 2015 (FR) ...................... 15 62369

(51) Int. Cl.
*F42B 3/12* (2006.01)
*F42B 3/198* (2006.01)
(Continued)

(52) U.S. Cl.
CPC .............. *F42B 3/127* (2013.01); *F42B 3/103* (2013.01); *F42B 3/107* (2013.01); *F42B 3/198* (2013.01); *B60R 2021/26029* (2013.01)

(58) Field of Classification Search
CPC ............. F42B 3/103; F42B 3/107; F42B 3/10
(Continued)

(56) References Cited

U.S. PATENT DOCUMENTS 4,014,263 A * 3/1977 Plumer ................... F42B 5/105
102/376
5,955,699 A * 9/1999 Perotto ............... B60R 21/2644
102/202.5
(Continued)

FOREIGN PATENT DOCUMENTS

EP 1489376 A1 12/2004
WO WO-03083404 A1 * 10/2003 .............. F42B 3/103
WO WO-2006/045726 A1 5/2006

OTHER PUBLICATIONS

International Search Report for PCT/EP2016/080342, ISA/EP, Rijswijk, NL, dated Feb. 9, 2017 with English translation attached.
(Continued)

*Primary Examiner* — Stephen Johnson
(74) *Attorney, Agent, or Firm* — Stephen T. Olson; Harness, Dickey & Pierce, P.L.C.

(57) ABSTRACT

An electro-pyrotechnical igniter includes a metal case, a cap and a plastic overmolding. The metal case contains pyrotechnical material and includes at least one vent on a side wall thereof. The cap is made from electrically insulating material and covers the metal case at least at the at least one vent. The plastic overmolding covers at least one end of the cap. The metal case includes at least one shoulder arranged between the side vent and a zone of the metal case across from the end of the cap covered by the overmolding.

15 Claims, 1 Drawing Sheet

(51) Int. Cl.
*F42B 3/103* (2006.01)
*F42B 3/107* (2006.01)
*B60R 21/26* (2011.01)

(58) Field of Classification Search
USPC .................................................. 102/206, 218
See application file for complete search history.

(56) References Cited

U.S. PATENT DOCUMENTS

| | | | |
|---|---|---|---|
| 6,796,245 B2* | 9/2004 | Parker | B60R 22/4628 |
| | | | 102/202.1 |
| 2005/0115453 A1* | 6/2005 | Takahara | F42B 3/127 |
| | | | 102/530 |
| 2006/0017269 A1 | 1/2006 | Kuroda et al. | |
| 2007/0261582 A1 | 11/2007 | Lahitte et al. | |

OTHER PUBLICATIONS

Written Opinion of the ISA for PCT/EP2016/080342, ISA/EP, Rijswijk, NL, dated Feb. 9, 2017.
French Search Report for FR1562369, INPI, Courbevoie, dated Sep. 14, 2016.

* cited by examiner

PYROTECHNICAL IGNITER

CROSS-REFERENCE TO RELATED APPLICATIONS

This application is a 371 U.S. National Stage of International Application No. PCT/EP2016/080342, filed Dec. 8, 2016, which claims priority to French Patent Application No. FR 1562369, filed Dec. 15, 2015. The entire disclosures of the above applications are incorporated herein by reference.

FIELD

The present invention generally relates to a pyrotechnical igniter, and in particular an electro-pyrotechnical igniter comprising a side vent, for discharging hot gases and hot particles on one side of the igniter. Such an igniter is typically used in a gas generator for a motor vehicle safety system, such as an airbag.

BACKGROUND

Igniters are known in the prior art with a side vent on the metal case containing the pyrotechnic material, like that described for example in document WO2006045726A1. However, the side vent is generally made by a striking operation, which deforms the case and can subsequently cause problems with the plastic cap that covers the metal case to insulate it. Indeed, it may then be difficult to slip the plastic cap on the case due to variations in shapes and dimensions if the tolerance between the metal case and the cap is small. If, conversely, the tolerance between the metal case and the cap is more significant, liquid plastic may penetrate or infiltrate between the metal case and the cap and/or between the cap and the manufacturing mold during an overmolding operation. Quality and manufacturing problems then appear (appearance rejects, dimensional rejects and functional rejects, increased cycle times due to igniters blocked in the injection mold).

Document EP 1,489,376 A1 discloses an igniter with a case having a conical portion.

SUMMARY

One aim of the present invention is to resolve the drawbacks of the prior art documents mentioned above, and in particular, first of all, to propose an electro-pyrotechnical igniter with a metal case that comprises at least one radial vent, and that is easy to manufacture without causing rejects or manufacturing stoppages.

To that end, a first aspect of the invention relates to an electro-pyrotechnical igniter comprising:
- a metal case containing pyrotechnical material, comprising at least one vent on a side wall,
- a cap made from electrically insulating material covering the metal case at least at said at least one vent,
- plastic overmolding covering at least one end of the cap, characterized in that the metal case comprises at least one shoulder arranged between the side vent and a zone of the metal case across from the end of the cap covered by the overmolding. The metal case has a shoulder (or a widening, flaring, an increase in diameter or a reduction in diameter) between its open end, i.e., the end by which the pyrotechnical material is loaded, and the zone where the vent is positioned, which makes it possible to guarantee that the deformations imposed on the case during the manufacturing of the vent will not affect the open end, since the diameters are different (the deformations related to striking of the vent remain "confined" in the zone of the cartridge with a small diameter, since the shoulder or flare can be likened to a rib that increases the stiffness). It is then possible to adjust the cap very closely on the non-deformed zone of the case repeatably, such that there are no plastic infiltrations during the overmolding (between the cap and the metal case, or between the cap and the manufacturing mold), while guaranteeing mounting even though the tolerance is very small or even nonexistent. In other words, the shoulder of the metal case makes it possible to guarantee that a zone at the open end of the case, or at the very least a zone between the shoulder and the open end of the case (which may have a smaller diameter than the shoulder), will be dimensionally repeatable to be able to slip a cap there that is next overmolded, all without leaks, rising or infiltrating plastic, even if the metal case is deformed or dimensionally not repeatable at the side vent. The vent is part of the case, initially closed and connected to the case, arranged to open at a predetermined pressure when the pyrotechnic material is ignited and thus to de-confine the igniter.

As explained above, before manufacturing the igniter, the cap is an independent component from the overmolding and the case. The shoulder makes it possible to guarantee that the cap can be deposited easily above the metal case without overmolded plastic being able to be inserted later between the cap and the case.

Advantageously, the vent is part of the case, arranged to remain secured to the case after opening. In other words, the weak zone that preforms the vent comprises at least one open line.

Put differently, the metal case has a geometric flaw, relative to a nominal dimension such as a diameter, at the upper vents with a geometric flaw, relative to a nominal dimension such as a diameter, at the portion of the case between the open end and the shoulder.

In other words, the applicant has noted that the shoulder makes it possible to compensate a geometric flaw, relative to a nominal dimension such as a diameter, at the vents greater than 0.7% of the nominal dimension, or even greater than 1% of the nominal dimension, or even greater than 1.5% of the nominal dimension. For example, if the case has a nominal diameter, the circumscribed diameter of the case at the vent once the latter is formed may be 0.7%, or even 1%, or even 1.5% greater than the nominal diameter.

It is understood that the vent is not open as long as the igniter has not operated. Conversely, it is visible because such a vent is formed by a straight or curved line forming a weak area in the side wall of the metal case.

Advantageously, the case has an axial direction forming an axis, and a projection of the weak area, on a projection plane comprising the axis of the case, forms a curved line. This type of weak area creates more flaws on the case during its production by a striking operation than a straight line.

Advantageously, the vent is formed on a side surface of the case that is initially cylindrical.

Advantageously, the vent is formed on a first initially cylindrical portion of the side surface of the case, the initial diameter of which is smaller than that of a second portion of the side surface of the case, located on the other side of the shoulder, which serves as positioning surface to receive the cap. In other words, the cap is received and positioned before overmolding on the second cylindrical portion of the side surface. The second cylindrical portion is more precise than the first cylindrical portion, since it is separated there-from by the shoulder. There is no undercut, which makes it possible to guarantee components that are easy to manufacture and assemble.

Advantageously, the circumscribed diameter of the case at the vents is at least 10% smaller than the circumscribed diameter of the case across from the end of the cap covered by the overmolding. Preferably, the circumscribed diameter of the case at the vents is less than 5% smaller. Still more preferably, the circumscribed diameter of the case at the vents is less than 2% smaller.

Advantageously, the side wall comprises at least one flat. It is possible to consider that the wall of the metal case comprises several flats, for example two, three, four or five flats, and in this case, the shoulder or widening makes it possible to go from the zone where the flat(s) are installed (therefore with a noncircular cross-section) to the zone where the cap will be overmolded, with a circular section.

Advantageously, said at least one vent is arranged on said at least one flat.

Advantageously, a circumscribed diameter of the metal case at the end of the cap is larger than a circumscribed diameter of the metal case at said at least one vent. The manufacturing method is made easier, since the beginning of the slipping of the cap on the small diameter benefits from a significant tolerance.

In other words, the invention relates to an electro-pyrotechnical igniter comprising:
a metal case containing pyrotechnical material, comprising at least one vent on a side wall,
a cap made from electrically insulating material covering the metal case at least at said at least one vent,
plastic overmolding covering at least one end of the cap, characterized in that the metal case has a circumscribed diameter of the metal case at the end of the cap larger than a circumscribed diameter of the case at said at least one vent.

Advantageously, a circumscribed diameter of the metal case at the end of the cap is smaller than a circumscribed diameter of the metal case at said at least one vent. It is possible to consider a decreased diameter. According to one particular embodiment, it is also possible to consider that the plastic cap comprises a resilient flange that forms the end, and that deforms to make it possible to slip the cap on the case, and that returns to its position when it passes the shoulder.

Advantageously, said at least one vent of the metal case is defined by a thinner material zone. The center zone may then form a straight or curved preferred breaking line, in order to guarantee that the opening is always done in the right location.

Advantageously, said at least one vent of the metal case is obtained through a striking operation. Such an operation is typically done with a die and a punch, economically, quickly and repeatably.

Advantageously, the metal case comprises a bottom and a side wall. In other words, the metal case is dice- or cup-shaped with the side wall arranged between the bottom and an opening of the case. The side wall is then typically cylindrical; it is possible to consider an undercut corner to eject the case easily when it is manufactured by stamping. Advantageously, the metal case has a symmetry of revolution around an axis.

Advantageously, the plastic cap covers the bottom and the side part of the case, at least until the overmolding. The electrical insulation of the metal case is then complete.

Advantageously, the electro-pyrotechnical igniter comprises a hermetic crossing, for example of the glass-metal type, arranged to insulate two electrical circuit portions from one another, and the metal case is welded, for example by transparency, on the hermetic crossing. Typically, the electrical circuit portions to be insulated from one another are the lugs or connecting pins of the igniter. It is possible to provide a metal intermediate part between the hermetic crossing and the metal case, also fastened by welding.

Advantageously, the cap has a first tolerance with the metal case at the zone where said at least one vent is installed, a second tolerance with the metal case at the fastening zone, smaller or even strictly smaller than the first tolerance.

Advantageously, the second tolerance is positive or nil.

The first tolerance, relatively significant, makes it possible to compensate the deformations at the radial or side vent, i.e., the tolerance prevents deformation of the cap by the case at the radial vent, for easy mounting of the cap on the case, and the second tolerance, relatively small or nil, makes it possible to limit the insertions or rising of plastic between the cap and the case or the manufacturing tool, during the overmolding operation.

Advantageously, the first tolerance at the radius is comprised in a range from 0.15 mm to 0.35 mm.

In other words, the invention relates to an electro-pyrotechnical igniter comprising:
a hermetic crossing, for example of the glass-metal type, arranged to insulate two electrical circuit portions from one another,
a metal case containing pyrotechnical material, fastened on the hermetic crossing at a fastening zone, and comprising at least one vent on a side wall,
a cap made from electrically insulating material covering the metal case at least at said at least one vent,
plastic overmolding covering at least one end of the cap, characterized in that the metal case comprises at least one shoulder arranged between the side vent and said end of the cap.

A second aspect of the invention relates to a metal case for an igniter according to the first aspect of the invention.

A third aspect of the invention relates to a motor vehicle safety device such as an airbag module, comprising at least one igniter according to the first aspect of the invention.

A third aspect of the invention relates to a motor vehicle comprising at least one igniter according to the first aspect of the invention.

DETAILED DESCRIPTION OF THE DRAWINGS

Other features and advantages of the present invention will appear more clearly upon reading the following detailed description of one embodiment of the invention, provided solely as a non-limiting example and illustrated by the appended drawings, in which.

Figure 1:
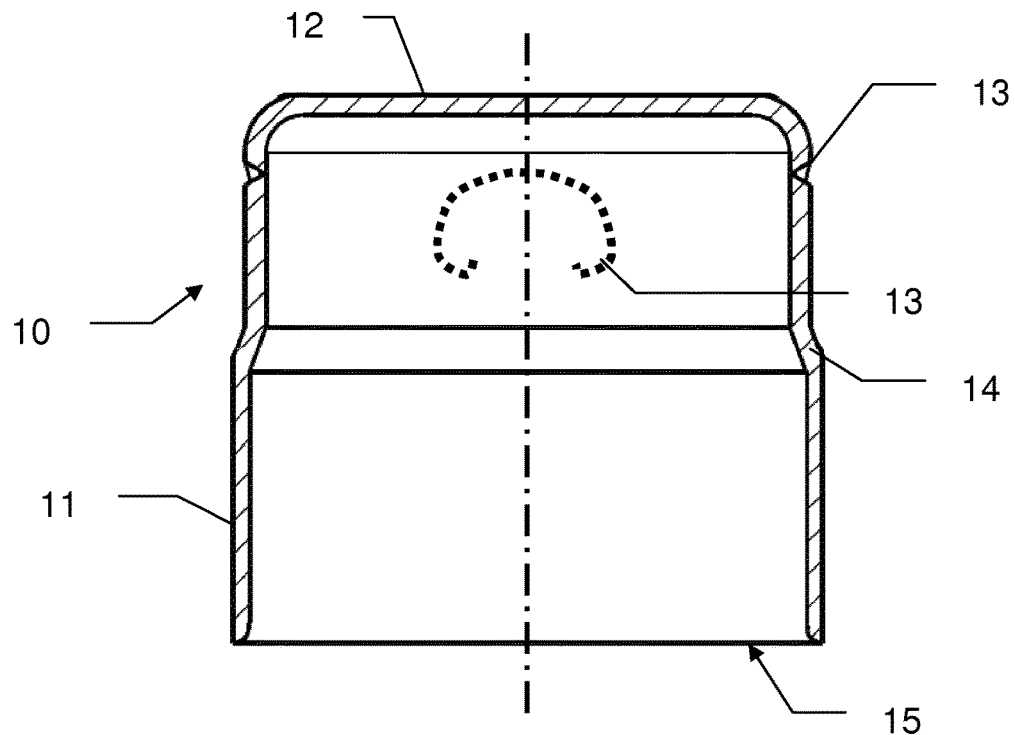
FIG. 1 shows a sectional view of a metal case for an igniter according to the present invention.

FIG. 1 shows an igniter case 10 with a generally cylindrical shape with a side wall 11 that has an open end 15, and a closed end with a bottom 12.

On the side wall 11, several vents 13 are formed by weak lines where the thickness of the side wall is greatly reduced and defines favored opening zones when the pressure inside the metal case 10 increases.

Lastly, a shoulder 14 of the side wall 11 is provided between the open end 15 and the vents 13. Consequently, the side wall 11 has two coaxial cylinder portions (separated by the shoulder 14), and on the small-diameter cylinder, close to the bottom, vents 13 are formed. Cylinder refers to a shape that has a base line, traveled by parallel generatrices. The small diameter may have a diameter of 12.4 mm, while the large one may have a diameter of 12.6 mm.

One may also say that the diameter of the case 10 between the open end 15 and the shoulder 14 is larger than the diameter of the case 10 at the vents, and in particular that the circumscribed diameter of the case 10 between the open end 15 and the shoulder 14 is larger than the circumscribed diameter of the case 10 at the vents.

Figure 2:
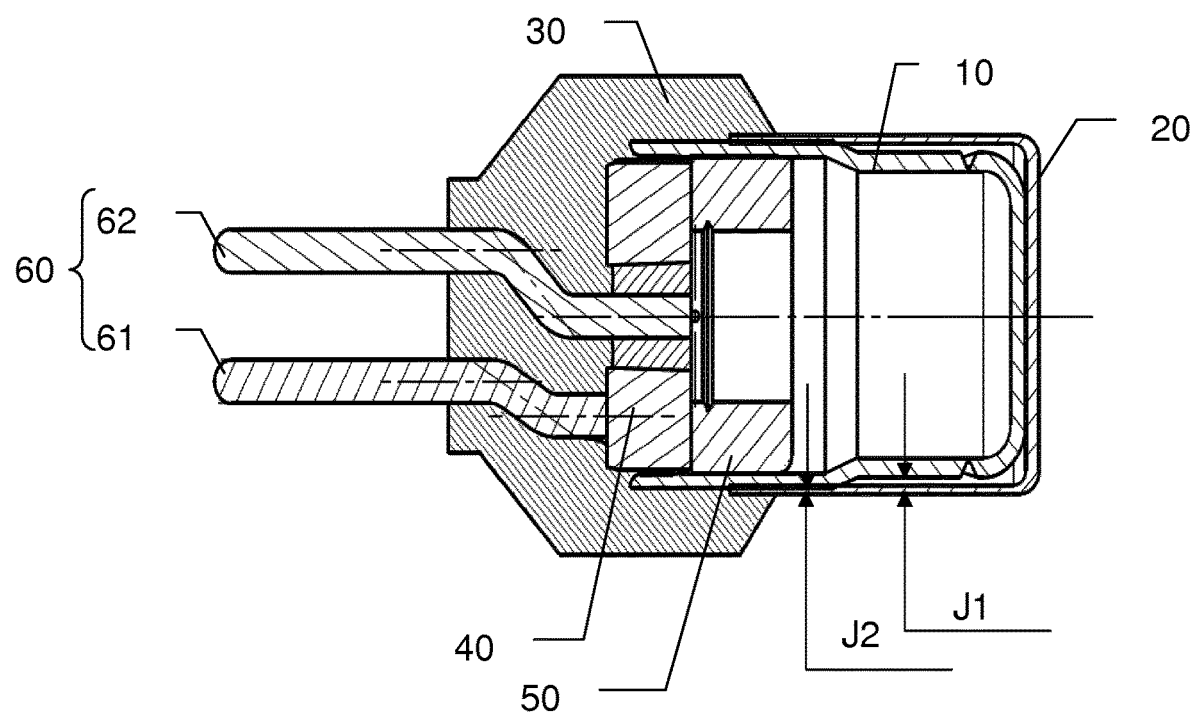
FIG. 2 shows a sectional view of an igniter according to the invention, comprising the metal case of FIG. 1.

FIG. 2 in turn shows an electro-pyrotechnical igniter that comprises the metal case 10. The latter may be fastened on a hermetic crossing 40 of the glass-metal type. The electro-pyrotechnical igniter comprises a loading tube 50 that may define a loading well, and the metal case 10 contains one or several pyrotechnical materials, not shown.

The hermetic crossing 40 primarily serves to electrically insulate two connecting pins 61 and 62 of a connecting interface 60 from one another, to force an ignition current to pass through a resistive bridge arranged between the connecting pins 61 and 62.

The pin 61 is directly connected to a metal part of the hermetic crossing and any metal element of the igniter, such as the metal case 10, must be electrically insulated to avoid any risk of untimely ignition. To that end, the metal case 10 is covered by a plastic cap 20, for example, and by a plastic overmolding 30 that covers the rest of the metal case 10, as well as an end of the cap 20.

During the overmolding operation, it is important to prevent infiltrations or injections of liquid plastic between the metal case 10 and the cap 20 and/or the molding tool itself, to avoid blockages of the electro-pyrotechnical igniter in the mold, and appearance rejects or dimensional rejects. It is therefore important to have a good fit between the metal case 10 and the cap 20, at the end of the cap 20.

However, due to the manufacturing operation of the vents 13, this operation often deforms the metal case 10. In order to limit the influence of this or these deformations, the invention provides the shoulder 14, to have a diameter of the metal case 10 at the overmolding zone of the cap larger than the diameter of the zone where the vents 13 are installed. Thus, the deformations do not influence the large diameter, and it is possible to provide a precise adjustment of the cap 20 on the metal case 10, with a small tolerance to limit the infiltrations of plastic between the cap 20 and the metal case 10, or the manufacturing mold.

Furthermore, this embodiment makes it possible to provide a first tolerance J1 between the cap 20 and the metal case 10 at the zone where the vents 13 are installed and a second tolerance J2 between the cap 20 and the metal case 10 at the fastening zone, the second tolerance being positive or nil, and smaller than the first tolerance.

For example, it is possible to provide a second tolerance with a nil radius J2 or even a slightly gripped mounting of the cap 20 on the large diameter of the metal case 10, where the end of the cap 20 is positioned. In this case, the negative tolerance can be comprised between 0 and 0.1 mm at the radius (it therefore involves gripping). At the vents 13, it is for example possible to provide a first tolerance with the radius J1 comprised between 0.10 mm and 0.40 mm, or comprised between 0.15 mm and 0.35 mm. This makes it possible to mount the cap 20 on the metal case 10 without risk of interference, even if the latter is slightly deformed at the vents 13.

With this embodiment, during the mounting of the cap 20 on the metal case 10, the first tolerance J1 allows an easy passage, and the second tolerance J2 guarantees that the cap 20 will deform little or not at all during the overmolding operation, with a good adjustment between the metal case 10, the cap 20 and the manufacturing mold, which reduces the risk of infiltration or rising of liquid plastic.

It will be understood that various changes and/or improvements can be made to the various embodiments of the invention described in the present description without going beyond the scope of the invention defined by the appended claims. In particular, it is provided to mount the cap on the metal case with nil or very slightly negative tolerance J2.

The invention claimed is:

1. An electro-pyrotechnical igniter comprising:
   a metal case containing pyrotechnical material, the metal case including a first end having a first external diameter and a second end having a second external diameter, the first external diameter being smaller than the second external diameter, the first end including at least one vent on a side wall thereof;
   a cap made from electrically insulating material and having an open end and a closed end, the cap covering the first end of the metal case and at least an axial portion of the second end of the case, the cap covering the at least one vent; and
   a plastic overmolding radially covering the open end of the cap,
   wherein the metal case includes a shoulder arranged between the first end of the case and the second end of the case, and
   wherein a first outer surface of the first end of the metal case including the at least one vent on the side wall thereof is substantially parallel to a second outer surface of the second end of the metal case.

2. The electro-pyrotechnical igniter according to claim 1, wherein a first circumscribed diameter of the metal case at the end of the cap is larger than a second circumscribed diameter of the metal case at the at least one vent.

3. The electro-pyrotechnical igniter according to claim 1, wherein the case includes a first circumscribed diameter at the closed end that is smaller than a second circumscribed diameter of the metal case at the open end.

4. The electro-pyrotechnical igniter according to claim 1, wherein the metal case includes a bottom.

5. The electro-pyrotechnical igniter according to claim 1, wherein the metal case is welded on a hermetic crossing.

6. The electro-pyrotechnical igniter according to claim 1, wherein the cap has a first tolerance with the metal case at a zone where the at least one vent is installed, a second tolerance with the metal case at the end of the cap covered by the overmolding, second tolerance being smaller than the first tolerance.

7. The electro-pyrotechnical igniter according to claim 6, wherein the first tolerance is in a range from 0.15 mm to 0.35 mm.

8. The electro-pyrotechnical igniter of claim 1, in combination with a motor vehicle safety device.

9. The motor vehicle safety device of claim 8, in combination with a motor vehicle.

10. The electro-pyrotechnical igniter of claim 1, wherein the cap is radially spaced from the first outer surface of the case.

11. The electro-pyrotechnical igniter of claim 1, wherein a first tolerance is radially between the cap and the first portion and a second tolerance is radially between the cap and the second portion, the first tolerance is greater than the second tolerance.

12. An electro-pyrotechnical igniter comprising:
a metal case containing pyrotechnical material, the metal case including a first end having a first outer surface with a first diameter and a second end having a second outer surface with a second diameter, the first diameter being smaller than the second diameter, the first end having the first diameter including at least one vent on a side wall thereof;
a cap made from electrically insulating material and having an open end and a closed end, the cap covering the first end of the metal case and at least an axial portion of the second end of the case, the cap covering the at least one vent; and
a plastic overmolding radially covering the open end of the cap,
wherein a first tolerance is radially between the cap and the first portion and a second tolerance is radially between the cap and the second portion, the first tolerance is greater than the second tolerance.

13. The electro-pyrotechnical igniter of claim 12, wherein a first outer surface of the first end of the metal case including the at least one vent on the side wall thereof is substantially parallel to a second outer surface of the second end of the metal case.

14. The electro-pyrotechnical igniter of claim 12, wherein the first tolerance is in a range from 0.15 mm to 0.35 mm.

15. The electro-pyrotechnical igniter of claim 12, wherein the cap is radially spaced from the first outer surface of the case.

\* \* \* \* \*